United States Patent
Wakabayashi

(10) Patent No.: US 11,271,500 B2
(45) Date of Patent: Mar. 8, 2022

(54) ROTATING ELECTRIC MACHINE DRIVE UNIT

(71) Applicant: HONDA MOTOR CO., LTD., Tokyo (JP)

(72) Inventor: Ryuta Wakabayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/870,167

(22) Filed: May 8, 2020

(65) Prior Publication Data
US 2020/0358383 A1    Nov. 12, 2020

(30) Foreign Application Priority Data

May 9, 2019   (JP) .............................. JP2019-089096

(51) Int. Cl.
*H02P 7/343*   (2016.01)
*B60K 1/02*   (2006.01)

(52) U.S. Cl.
CPC ................ *H02P 7/343* (2013.01); *B60K 1/02* (2013.01)

(58) Field of Classification Search
CPC .................................. H02P 7/343; B60K 1/02
See application file for complete search history.

(56) References Cited

U.S. PATENT DOCUMENTS

| | | | |
|---|---|---|---|
| 2011/0039649 A1 | 2/2011 | Tanae et al. | |
| 2013/0285492 A1* | 10/2013 | Ozaki | H02K 11/215 310/71 |
| 2015/0288314 A1* | 10/2015 | Nonaka | H02K 16/02 318/724 |
| 2016/0172911 A1* | 6/2016 | Yoshizawa | H02K 1/243 310/215 |
| 2018/0022202 A1 | 1/2018 | Urabe et al. | |

FOREIGN PATENT DOCUMENTS

| | | |
|---|---|---|
| JP | 2010-052671 A | 3/2010 |
| WO | WO 2016/121032 A1 | 8/2016 |

OTHER PUBLICATIONS

Jan. 5, 2021, Japanese Office Action issued for related JP Application No. 2019-089096.

* cited by examiner

*Primary Examiner* — Zoheb S Imtiaz
(74) *Attorney, Agent, or Firm* — Paratus Law Group, PLLC

(57) ABSTRACT

A rotating electric machine drive unit includes a first rotating electric machine; a second rotating electric machine; a rotating electric machine housing having a rotating electric machine accommodation portion; a power control unit having a power conversion unit which controls at least one of the first rotating electric machine and the second rotating electric machine; and a connecting member which electrically connects at least one of the first rotating electric machine and the second rotating electric machine to the power conversion unit of the power control unit. When viewed from a rotation axis direction of the first rotating electric machine and the second rotating electric machine, a part of the power control unit is disposed so as to overlap with at least one of the rotating electric machine housing and the first rotating electric machine in a radial direction of the first rotating electric machine.

6 Claims, 10 Drawing Sheets

ROTATING ELECTRIC MACHINE DRIVE UNIT

CROSS-REFERENCE TO RELATED APPLICATIONS

This application is based on and claims priority under 35 USC 119 from Japanese Patent Application No. 2019-089096 filed on May 9, 2019.

TECHNICAL FIELD

The present invention relates to a rotating electric machine drive unit mounted on an electric vehicle or the like.

BACKGROUND ART

In recent years, a rotating electric machine drive unit is mounted on an electric vehicle or the like. For example, in WO 2016/121032, a rotating electric machine drive unit which includes a generator capable of generating electricity by receiving power from an engine, a motor which drives a wheel, a case which accommodates the generator and the motor, and a power control device which controls the generator and the motor has been disclosed. In the rotating electric machine drive unit of WO 2016/121032, the generator and the motor are juxtaposed on the same axis and a power control device is mounted on a case.

In recent years, this type of a rotating electric machine drive unit has been required to be further reduced in size with the spread of electric vehicles.

However, the rotating electric machine drive unit disclosed in WO 2016/121032 has a problem that the size of the rotating electric machine drive unit is increased because the power control device is disposed above the generator and the motor.

SUMMARY OF INVENTION

An aspect of the invention provides a rotating electric machine drive unit which can be reduced in size.

An embodiment of the present invention relates to a rotating electric machine drive unit, which includes:

a first rotating electric machine;

a second rotating electric machine having a rotation axis positioned parallel to a rotation axis of the first rotating electric machine and shifted in at least one of an up-down direction and a horizontal direction;

a rotating electric machine housing having a rotating electric machine accommodation portion accommodating at least the first rotating electric machine;

a power control unit having a power conversion unit which controls at least one of the first rotating electric machine and the second rotating electric machine; and a connecting member which electrically connects at least one of the first rotating electric machine and the second rotating electric machine to the power conversion unit of the power control unit, in which when viewed from a rotation axis direction of the first rotating electric machine and the second rotating electric machine, a part of the power control unit is disposed so as to overlap with at least one of the rotating electric machine housing and the first rotating electric machine in a radial direction of the first rotating electric machine.

According to the above embodiment of the present invention, the size of the rotating electric machine drive unit can be reduced.

DESCRIPTION OF EMBODIMENTS

Hereinafter, an embodiment of a hybrid vehicle equipped with a rotating electric machine drive unit of the invention will be described with reference to the accompanying drawings.

<Hybrid Vehicle>

A hybrid vehicle 1 basically includes a driving device 11, a high-voltage battery BATh, a converter CONV, a low-voltage battery BATE a voltage control unit VCU, a first inverter INV1, a second inverter INV2, and a control device 14.

Figure 1:
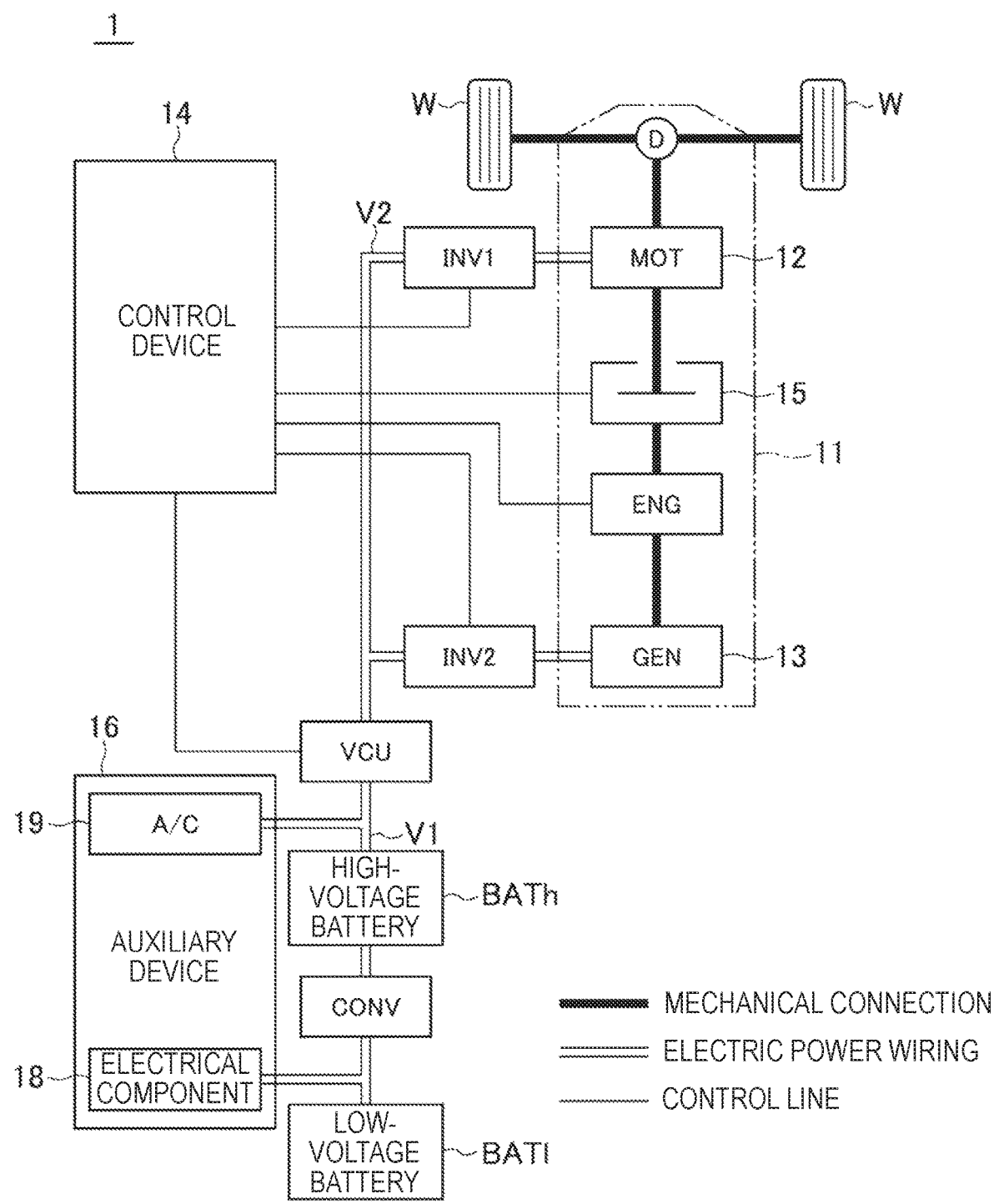
FIG. 1 is a block diagram illustrating a power system of a hybrid vehicle equipped with a rotating electric machine drive unit according to an embodiment of the invention.

In FIG. 1, a thick solid line indicates a mechanical connection, a double solid line indicates an electric power wiring, and a thin solid line indicates a control line (including a signal line).

The driving device 11 includes a first rotating electric machine 12 (MOT) and a second rotating electric machine 13 (GEN), each of which is a three-phase embedded magnet structure rotating electric machine that is vector-controlled, an engine ENG, a driving force transmission state switching unit 15, and a speed reducer D.

The driving force transmission state switching unit 15 includes a clutch (not illustrated) for directly connecting the engine ENG and the speed reducer D and a transmission or a fixed gear stage interposed between the clutch and the speed reducer D.

The engine ENG drives the second rotating electric machine 13 (GEN) as a generator. In this case, the second rotating electric machine 13 (GEN) is driven by the rotation power of the engine ENG to generate electric power.

In addition, the engine ENG is driven by the second rotating electric machine 13 (GEN) which operates as an electric motor when the hybrid vehicle 1 is braked and may also function as a mechanical load which rotates the crankshaft in an idle state.

The first rotating electric machine 12 (MOT) for driving the hybrid vehicle 1 operates (power runs) as an electric motor by power supply from at least one of the high-voltage battery BATh and the second rotating electric machine 13 (GEN) and generates torque for the hybrid vehicle 1 to travel. The torque generated by the first rotating electric machine 12 (MOT) is transmitted as driving force to wheels W via the speed reducer D. Further, the first rotating electric machine 12 (MOT) operates as a generator when the hybrid vehicle 1 is braked.

The high-voltage battery BATh has a plurality of storage cells connected in series and supplies a high voltage of, for example, 100 to 300 [V]. The power storage cell is, for example, a cell of a lithium ion battery or a nickel hydride battery. The high-voltage battery BATh may be a capacitor.

The converter CONV is a DC/DC converter which reduces the DC output voltage of the high-voltage battery BATh while keeping the DC.

The low-voltage battery BATl stores the voltage stepped down by the converter CONV, supplies a constant voltage of, for example, 12 [V] to an electrical component 18 such as a lighting unit included in an auxiliary device 16, and serves as a DC power source for the control devices 14 and the like.

The VCU boosts the V1 voltage, which is the output voltage of the high-voltage battery BATh, to the V2 voltage, which is the input voltage for the first rotating electric machine 12 (MOT) when the first rotating electric machine 12 (MOT) operates as a motor.

Also, the VCU steps down the V2 voltage, which is the output voltage of the first rotating electric machine 12 (MOT) when the first rotating electric machine 12 (MOT) operates as a generator during braking of the hybrid vehicle 1, and set it to the V1 voltage.

Further, the VCU steps down the V2 voltage, which is generated by the second rotating electric machine 13 (GEN) by the driving of the engine ENG and converted into DC, and set it to the V1 voltage.

That is, the VCU functions as a step-up/step-down converter (bidirectional voltage converter) between the high-voltage battery RAM, the first rotating electric machine 12 (MOT), and the second rotating electric machine 13 (GEN).

The electric power at the V1 voltage lowered by the VCU is supplied as electric power for driving an electric air compressor 19 included in the auxiliary device 16 and/or electric power for charging the high-voltage battery BATh.

The first inverter INV1 converts the V2 voltage into an AC voltage and supplies (power running) a three-phase current to the first rotating electric machine 12 (MOT). Further, the first inverter INV1 converts an AC voltage generated by the first rotating electric machine 12 (MOT) during braking of the hybrid vehicle 1 into a V2 voltage (regeneration).

The second inverter INV2 converts an AC voltage generated by the second rotating electric machine 13 (GEN) by driving the engine ENG into a V2 voltage which is a DC voltage. Further, in some cases, the second inverter INV2 converts the V2 voltage, which is generated by the first rotating electric machine 12 (MOT) during the braking of the hybrid vehicle 1 and converted by the first inverter INV1, into an AC voltage and supplies the three-phase current to the second rotating electric machine 13 (GEN).

The control device 14 performs vector control including the first inverter INV1, the first rotating electric machine 12 (MOT), the second inverter INV2, the second rotating electric machine 13 (GEN), and the VCU 12 and further controls the engine ENG, the driving force transmission state switching unit 15, and the auxiliary device 16.

In this hybrid vehicle 1, the driving force transmission state switching unit 15 and the mechanical connection extending to both sides from the driving force transmission state switching unit 15 are used only when the wheel W is driven through the speed reducer D via the driving force transmission state switching unit 15 using the engine ENG as a power source. At the time of acceleration, the engine ENG and the first rotating electric machine 12 (MOT) may be used.

<Arrangement Configuration of Driving Device for Hybrid Vehicle>

Figure 2:
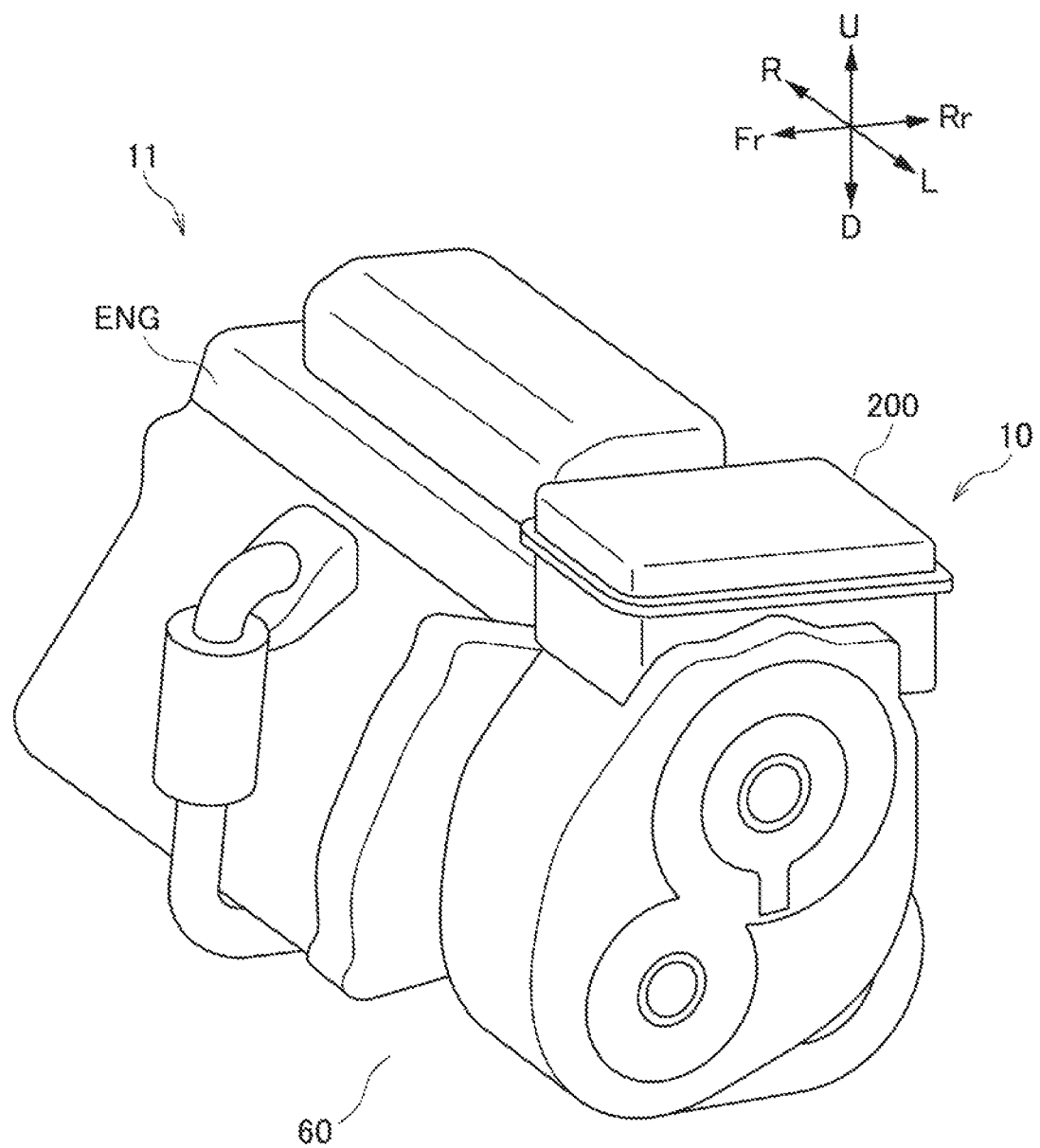
FIG. 2 is a perspective view of a drive device of the power system of the hybrid vehicle equipped with the rotating electric machine drive unit according to the embodiment of the invention.
Figure 3:
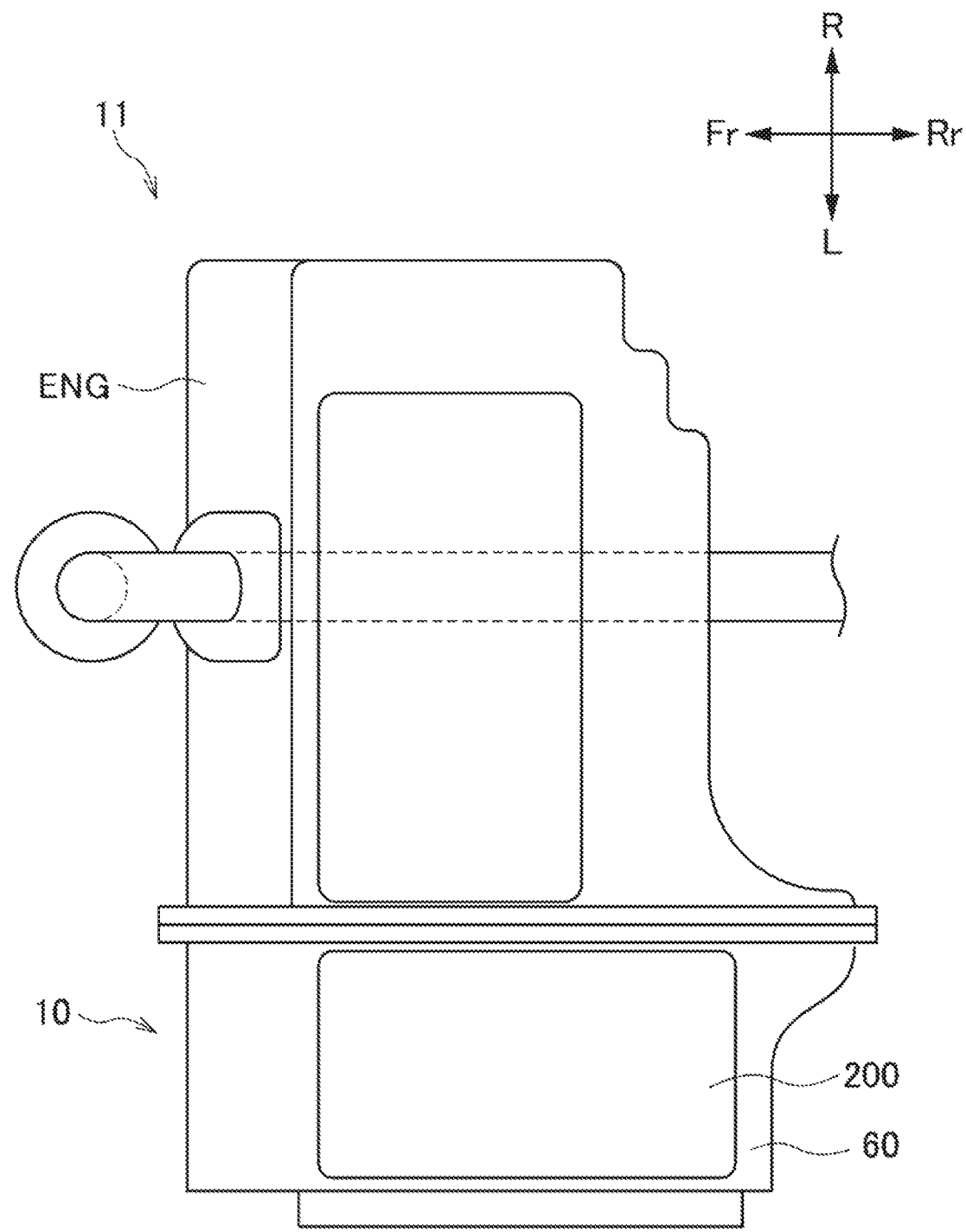
FIG. 3 is a top view of the drive device of the power system of the hybrid vehicle equipped with the rotating electric machine drive unit according to the embodiment of the invention.
Figure 4:
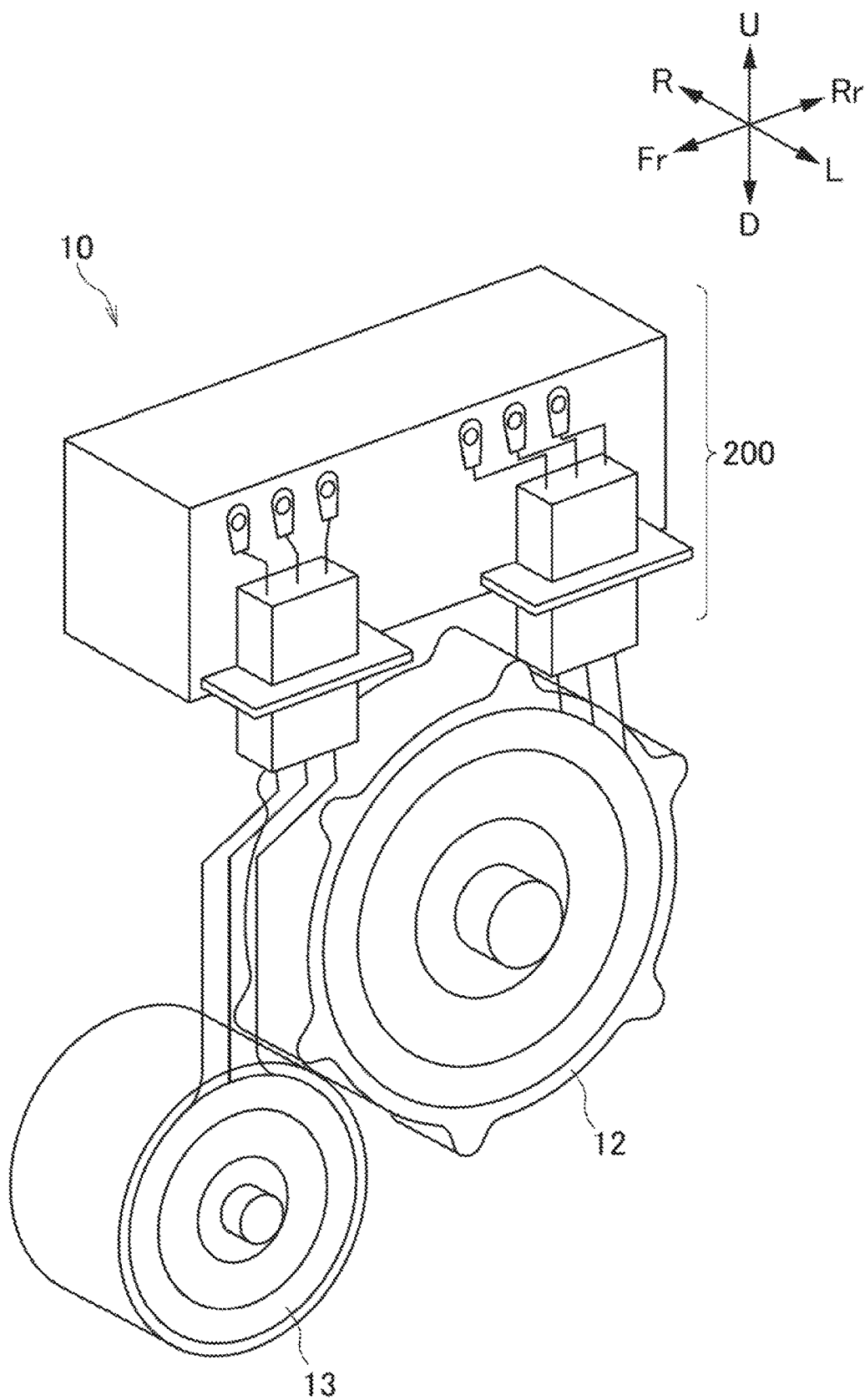
FIG. 4 is a perspective view of the rotating electric machine drive unit according to the embodiment of the invention, with a rotating electric machine housing and a power unit housing removed.

As illustrated in FIGS. 2 to 4, in the driving device 11, an engine ENG and the rotating electric machine drive unit 10 are located adjacent to each other and arranged in an engine room (not illustrated). The rotating electric machine drive unit 10 includes the first rotating electric machine 12 (MOT) and the second rotating electric machine 13 (GEN), a rotating electric machine housing 60 which accommodates the first rotating electric machine 12 (MOT) and the second rotating electric machine 13 (GEN), and a power control unit 200 arranged on the rotating electric machine housing 60 for controlling the first rotating electric machine 12 (MOT) and the second rotating electric machine 13 (GEN).

In FIGS. 2 to 9, symbols Fr, Rr, L, R, U, and D indicate front, rear, left, right, upper, and lower, respectively, according to the direction viewed from a driver.

<Arrangement Configuration of Rotating Electric Machine Drive Unit>

Figure 5:
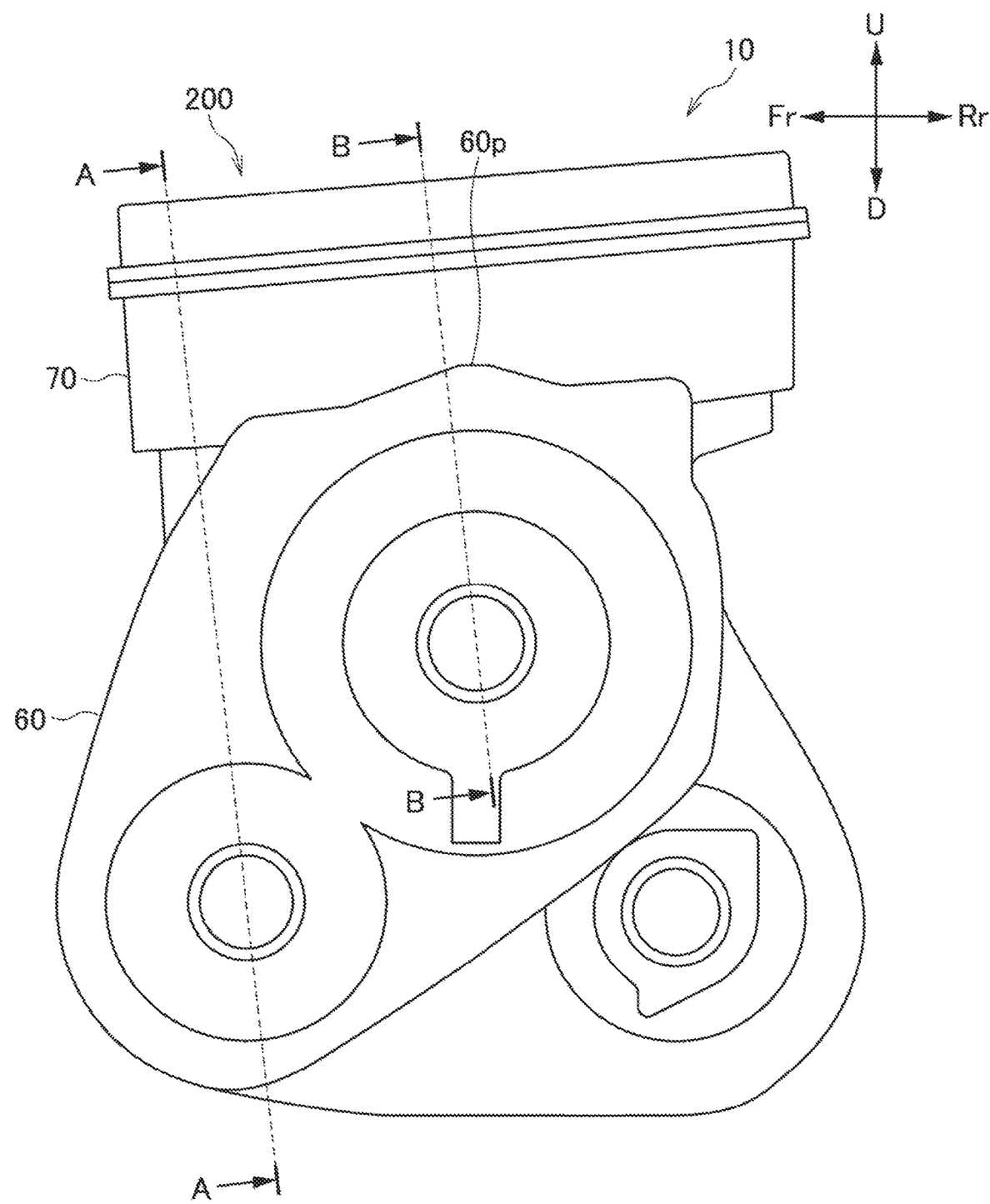
FIG. 5 is a side view of the rotating electric machine drive unit according to the embodiment of the invention.
Figure 6:
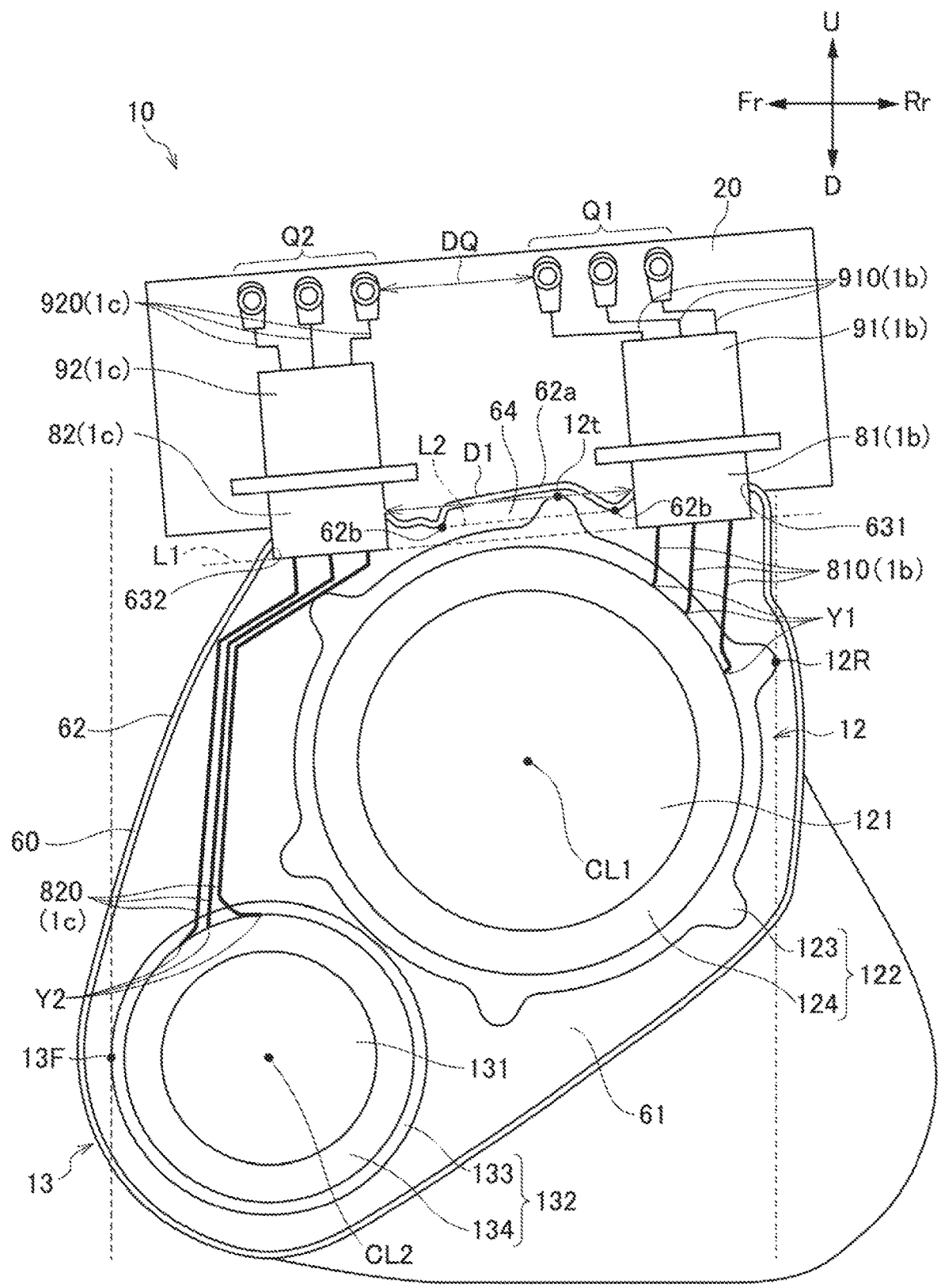
FIG. 6 is a side view of the rotating electric machine drive unit according to the embodiment of the invention, with the power unit housing removed.

As illustrated in FIGS. 5 and 6, the rotating electric machine drive unit 10 includes the first rotating electric machine 12, the second rotating electric machine 13, the rotating electric machine housing 60 which accommodates the first rotating electric machine 12 and the second rotating electric machine 13, the power control unit 200 having a power conversion unit 20, a first connecting member 1b for electrically connecting the first rotating electric machine 12 and the power conversion unit 20, and a second connecting member 1c for electrically connecting the second rotating electric machine 13 and the power conversion unit 20.

A rotation axis CL1 of the first rotating electric machine 12 and a rotation axis CL2 of the second rotating electric machine 13 are arranged in parallel and both extend in a left-right direction.

In this specification, in order to simplify the description, a direction parallel to the rotation axis CL1 of the first rotating electric machine 12 and the rotation axis CL2 of the second rotating electric machine 13, that is, the left-right direction is also referred to as a rotation axis direction.

The rotation axis CL2 of the second rotating electric machine 13 is disposed so as to be located lower and forward than the rotation axis CL1 of the first rotating electric machine 12 when viewed from the rotation axis direction.

As described above, by separately providing the rotation axis CL1 of the first rotating electric machine 12 and the rotation axis CL2 of the second rotating electric machine 13, the degree of freedom of the thickness dimension of the rotation axis CL1 of the first rotating electric machine 12 and the rotation axis CL2 of the second rotating electric machine 13 in the rotation axis direction can be improved. Thereby, the thickness of the first rotating electric machine 12 and the second rotating electric machine 13 in the rotation axis direction can be increased, and thus the output of the first rotating electric machine 12 and the second rotating electric machine 13 can be increased.

The first rotating electric machine 12 and the second rotating electric machine 13 are arranged so as to partially overlap in an up-down direction and a front-rear direction. Further, at least a part of the first rotating electric machine 12 and the second rotating electric machine 13 are arranged at positions overlapping in the left-right direction (rotation axis direction) (see FIG. 4). Thereby, the dimensions of the rotating electric machine drive unit 10 in the up-down direction, the front-rear direction, and the left-right direction can be respectively reduced.

<Rotating Electric Machine>

The first rotating electric machine 12 and the second rotating electric machine 13 are accommodated in the rotating electric machine housing 60.

The first rotating electric machine 12 includes a first rotor 121, and a first stator 122 including a first stator core 123 surrounding the outer periphery of the first rotor 121 and first coils 124 having three phases of U, V, and W mounted on the first stator core 123. One ends of the first coils 124 of respective phases of the first rotating electric machine 12 are connected to each other and the other ends are respectively connected to the first connecting member 1*b* as a first coil terminal Y1.

The second rotating electric machine 13 includes a second rotor 131, and a second stator 132 including a second stator core 133 surrounding the outer periphery of the second rotor 131 and second coils 134 having three phases of U, V, and W mounted on the second stator core 133. One ends of the second coils 134 of respective phases of the second rotating electric machine 12 are connected to each other and the other ends are respectively connected to the second connecting member 1*c* as a second coil terminal Y2.

<Power Control Unit>

Figure 7:
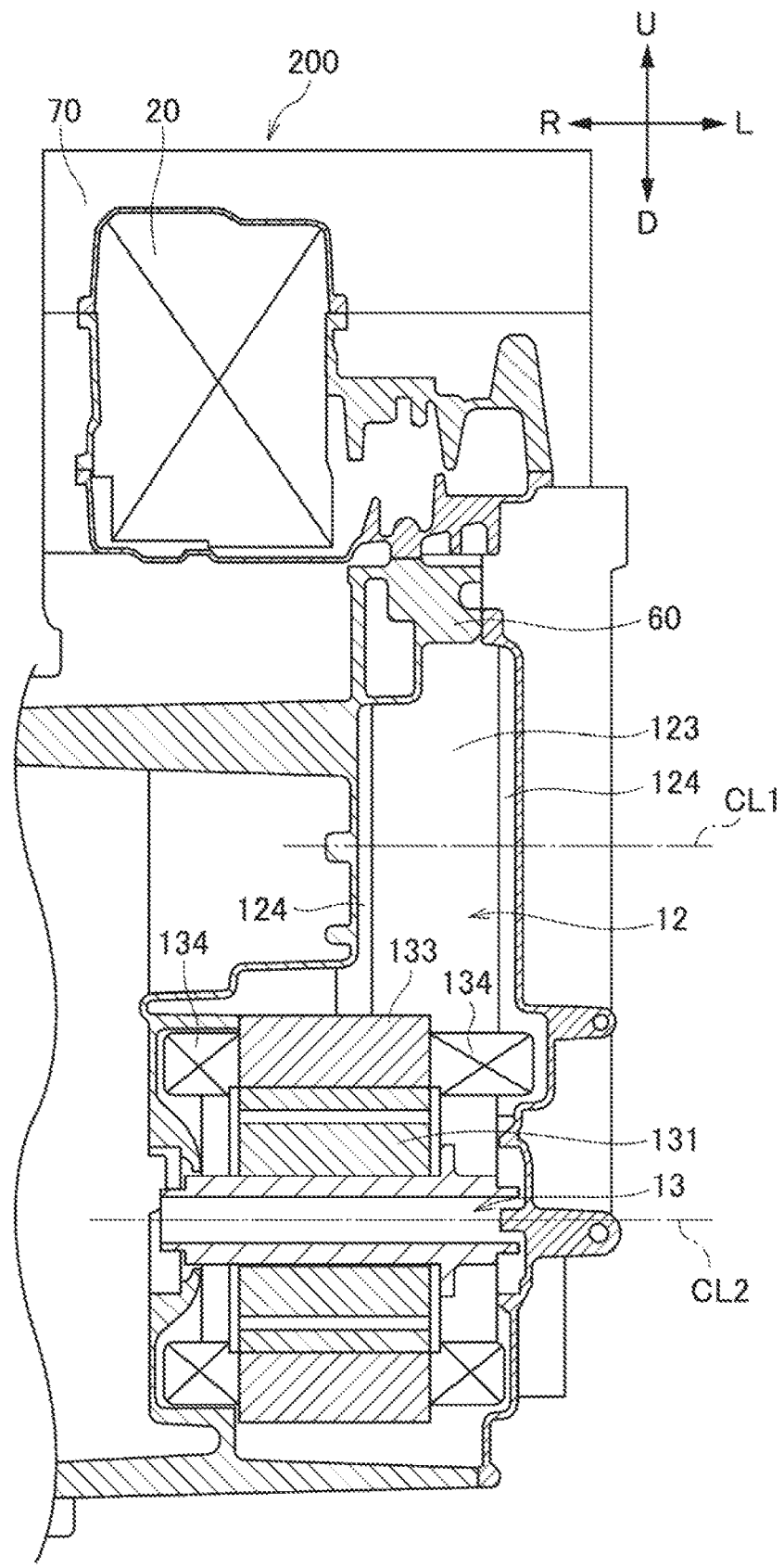
FIG. 7 is a cross-sectional view taken along the line A-A of FIG. 5.
Figure 8:
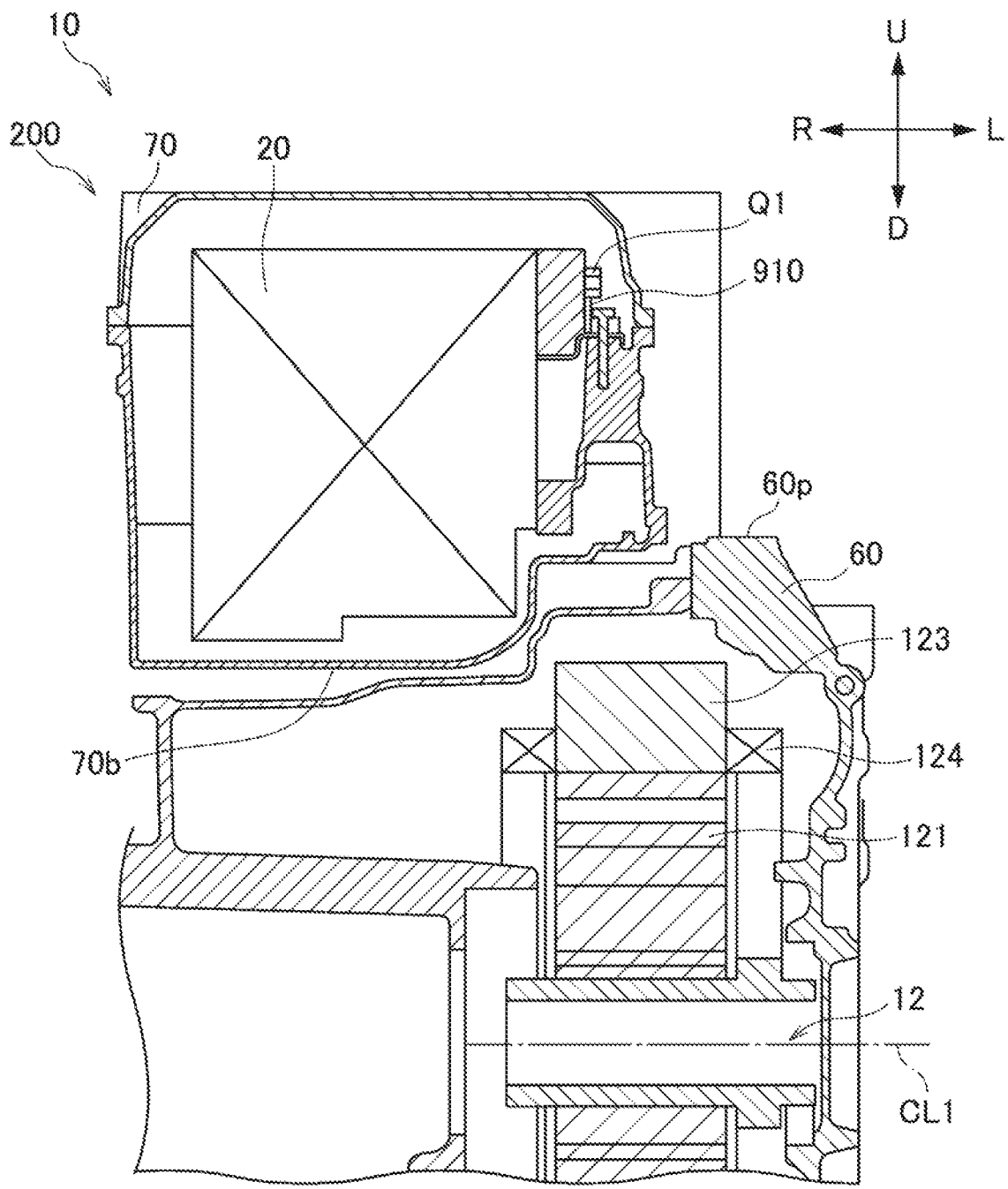
FIG. 8 is a cross-sectional view taken along the line B-B of FIG. 5.

Referring also to FIGS. 7 and 8, the power control unit 200 includes the power conversion unit 20 and a first power conversion unit side terminal portion Q1 and a second power conversion unit side terminal portion Q2 juxtaposed in the front-rear direction on the left end of the power conversion unit 20. The power conversion unit 20, the first power conversion unit side terminal portion Q1, and the second power conversion unit side terminal portion Q2 are accommodated in a power control unit housing 70.

Figure 10:
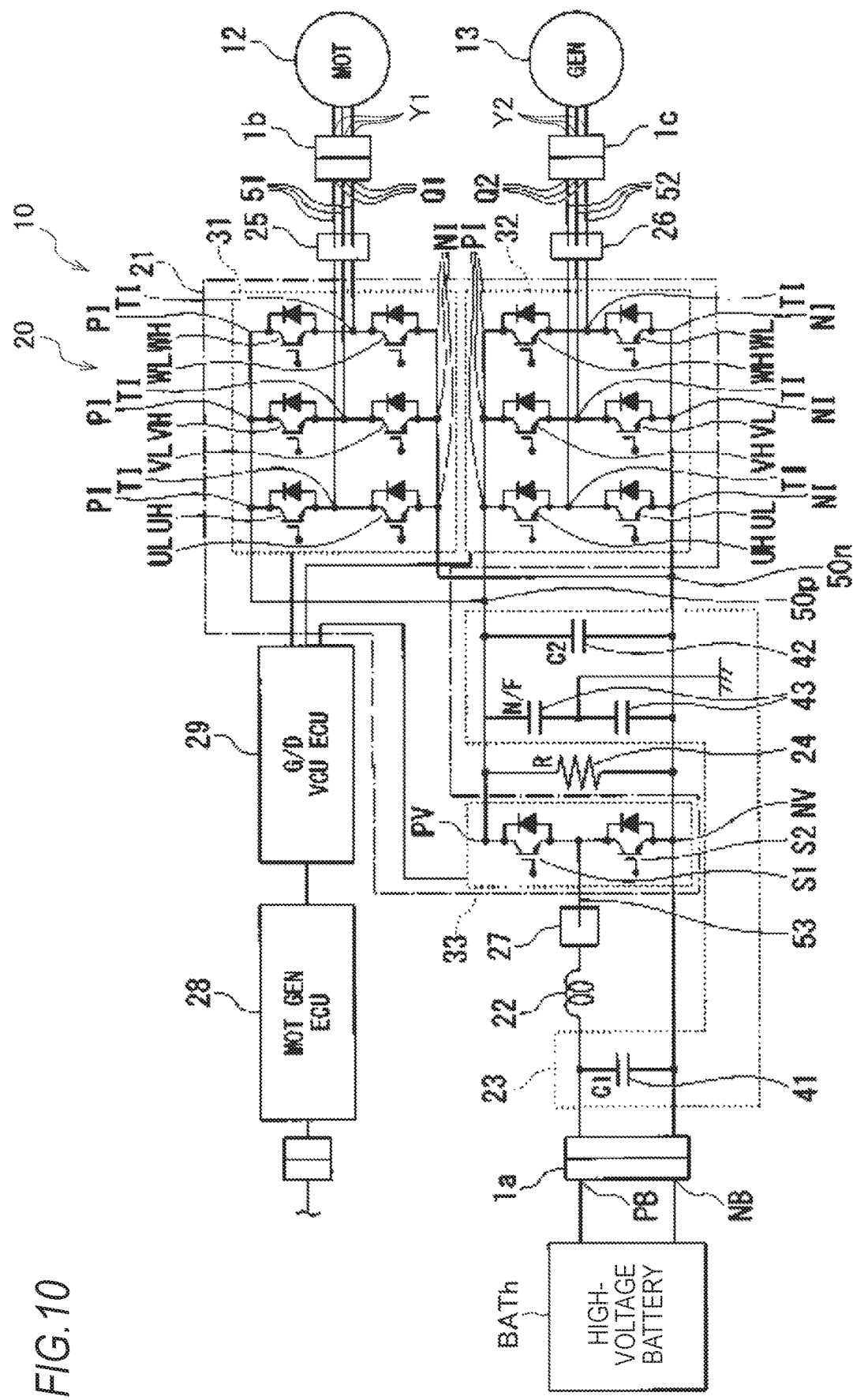
FIG. 10 is a diagram illustrating an electric circuit configuration of the rotating electric machine drive unit according to the embodiment of the invention.

The power conversion unit 20 is configured by circuit components including a power module 21, a reactor 22, a capacitor unit 23, a resistor 24, a first current sensor 25, a second current sensor 26, a third current sensor 27, an electronic control unit 28 (MOT GEN ECU), and a gate drive unit 29 (G/D Val ECU) (see FIG. 10).

As illustrated in FIG. 7, the power control unit 200 is mounted on the upper surface of the rotating electric machine housing 60 and is disposed above the second rotating electric machine 13. Further, the power control unit 200 is arranged so that a part thereof overlaps at least one of the rotating electric machine housing 60 and the first rotating electric machine 12 in the up-down direction when viewed from the rotation axis direction (see FIG. 5). Accordingly, the rotation axis CL2 of the second rotating electric machine 13 is located below the rotation axis CL1 of the first rotating electric machine 12, when viewed from the rotation axis direction. Therefore, at least a part of the power control unit 200 can be arranged in a space where the second rotating electric machine 13 is arranged when the first rotating electric machine 12 and the second rotating electric machine 13 are coaxially arranged. In this case, as illustrated in FIG. 8, the power control unit 200 is arranged such that a lowermost portion 70*b* of the power control unit housing 70 is located lower than an uppermost portion 60*p* of the rotating electric machine housing 60 above the first stator core 123 of the first rotating electric machine 12. Thus, the power conversion unit 20 can be disposed below, and thus the vertical dimension of the rotating electric machine drive unit 10 can be prevented from increasing.

Figure 9:
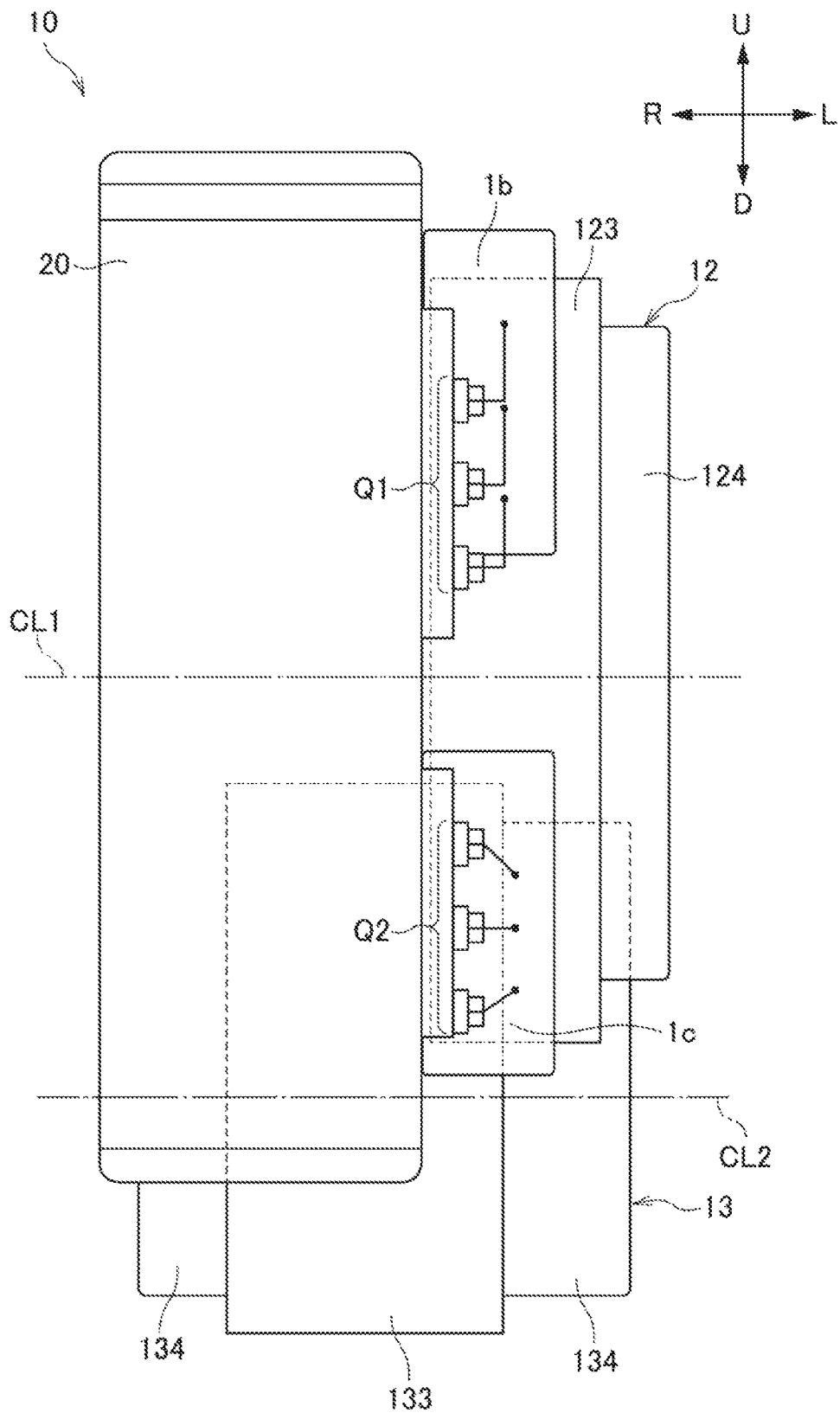
FIG. 9 is a top view of the rotating electric machine drive unit according to the embodiment of the invention, with the rotating electric machine housing and the power unit housing removed.

As illustrated in FIG. 9, the power conversion unit 20 is disposed on the right side of the first stator core 123 so as not to overlap with the first stator core 123 in a top view. Thereby, even when changing the vertical position and the size of the diameter of the first rotating electric machine 12, the power conversion unit 20 can be arranged below, and thus the vertical dimension of the rotating electric machine drive unit 10 can be reduced. Further, even when the vertical position of the first rotating electric machine 12 is different due to a difference in a vehicle type or the like, by adjusting the shape or arrangement position of the first connecting member 1*b* and the second connecting member 1*c* described below, it becomes easy to use the common power conversion unit 20 while suppressing the vertical dimension of the rotating electric machine drive unit TO.

The power conversion unit 20 is arranged so that at least a part thereof overlaps the second stator core 133 in the rotation axis direction when viewed from above. Thus, the length of the rotating electric machine drive unit 10 in the rotation axis direction (left-right direction) can be suppressed from increasing while reducing the vertical dimension of the rotating electric machine drive unit 10.

<Connecting Member>

Returning to FIG. 6, the first connecting member 1*b* electrically connects the first coil terminal Y1 of the first rotating electric machine 12 and the first power conversion unit side terminal portion Q1 of the power conversion unit 20. The second connecting member 1*c* electrically connects the second coil terminal Y2 of the second rotating electric machine 13 and the second power conversion unit side terminal portion Q2 of the power conversion unit 20.

The first connecting member 1*b* and the second connecting member 1*c* are arranged at different positions in the front-rear direction and are juxtaposed so as to straddle an uppermost portion 12*t* of the first rotating electric machine 12 in the front-rear direction. That is, the rotation axis CL1 of the first rotating electric machine 12 is located between the first connecting member 1*b* and the second connecting member 1*c* in the front-rear direction.

Further, the first connecting member 1*b* and the second connecting member 1*c* are arranged at positions that do not overlap with the first rotating electric machine 12, when viewed from the rotation axis direction, that is, at the outer peripheral portion of the first rotating electric machine 12. This makes it possible to easily assemble the first connecting member 1*b* and the second connecting member 1*c* when manufacturing the rotating electric machine drive unit 10.

The first connecting member 1*b* is disposed between the rotation axis CL1 of the first rotating electric machine 12 and a rear end portion 12R of the first stator core 123 of the first rotating electric machine 12 in the front-rear direction above the rotation axis CL1 of the first rotating electric machine 12. The second connecting member 1*c* is disposed between the rotation axis CL1 of the first rotating electric machine 12 and a front end portion 13F of the second stator core 133 of the second rotating electric machine 13 in the front-rear direction above the rotation axis CL2 of the second rotating electric machine 13. Accordingly, the dead space in the rotating electric machine housing 60 can be effectively used and the front-rear dimensions of the rotating electric machine drive unit 10 can be reduced.

Also, when viewed from the rotation axis direction, a distance Di between the first connecting member 1b and the second connecting member 1c at the position of the uppermost portion 12t of the first rotating electric machine 12 is longer than a distance DQ between the first power conversion unit side terminal portion Q1 and the second power conversion unit side terminal portion Q2, Thereby, even when a large-diameter rotating electric machine is used for the first rotating electric machine 12, or even when the rotation axis CL1 of the first rotating electric machine 12 is located above, regardless of the distance DQ between the first power conversion unit side terminal portion Q1 and the second power conversion unit side terminal portion Q2, it is possible to suppress an increase in the vertical dimension of the rotating electric machine drive unit 10.

Further, as illustrated in FIG. 9, the first connecting member 1b and the second connecting member 1c are arranged at positions overlapping the first rotating electric machine 12 in the rotation axis direction when viewed from above. Further, the first connecting member 1b and the second connecting member 1c are positioned so as to partially overlap the second rotating electric machine 13 in the rotation axis direction when viewed from above, Thus, it is possible to suppress an increase in the length dimension of the rotating electric machine drive unit 10 in the rotation axis direction.

Returning to FIG. 6 again, the first connecting member 1b includes a first rotating electric machine side connecting member 81 fixed to the rotating electric machine housing 60, a first rotating electric machine side connecting portion 810 for electrically connecting the first rotating electric machine side connecting member 81 and the first coil terminal Y1 of the first rotating electric machine 12, a first power conversion unit side connecting member 91 fixed to the power control unit housing 70, and a first power conversion unit side connecting portion 910 for electrically connecting the first power conversion unit side connecting member 91 and the first power conversion unit side terminal portion Q1 of the power conversion unit 20. The second connecting member 1c includes a second rotating electric machine side connecting member 82 fixed to the rotating electric machine housing 60, a second rotating electric machine side connection portion 820 for electrically connecting the second rotating electric machine side connecting member 82 and the second coil terminal Y2 of the second rotating electric machine 13, a second power conversion unit side connecting member 92 fixed to the power control unit housing 70, and a second power conversion unit side connecting portion 920 for electrically connecting the second power conversion unit side connecting member 92 and the second power conversion unit side terminal portion Q2 of the power conversion unit 20.

The first rotating electric machine side connecting member 81 and the second rotating electric machine side connecting member 82 are fixed to the upper surface of the rotating electric machine housing 60. The first rotating electric machine side connecting member 81 and the second rotating electric machine side connecting member 82 respectively have three-phase (U-phase, V-phase, and W-phase) connector terminals (not illustrated). The first rotating electric machine side connecting portion 810 is connected to the three-phase (U-phase, V-phase, and W-phase) connector terminals of first rotating electric machine side connecting member 81. The second rotating electric machine side connecting portion 820 is connected to the three-phase (U-phase, V-phase, and NV-phase) connector terminals of the second rotating electric machine side connecting member 82.

The first rotating electric machine 12 is arranged such that the uppermost portion 12t is located above an imaginary line L1 connecting the bottom of the first rotating electric machine side connecting member 81 and the bottom of the second rotating electric machine side connecting member 82. Thereby, the vertical dimension of the rotating electric machine drive unit 10 can be reduced.

The first power conversion unit side connecting member 91 and the second power conversion unit side connecting member 92 are fixed to the bottom surface of power control unit housing 70. The first power conversion unit side connecting member 91 and the second power conversion unit side connecting member 92 respectively have three-phase (U-phase, V-phase, and NV-phase) connector terminals (not illustrated). The first power conversion unit side connecting portion 910 is connected to the three-phase (U phase, V phase, and W phase) connector terminals of the first power conversion unit side connecting member 91. The second power conversion unit side connecting portion 920 is connected to the three phase (U phase, V phase, and W phase) connector terminals of the second power conversion unit side connecting member 92.

By respectively connecting the first rotating electric machine side connecting member 81 and the second rotating electric machine side connecting member 82 arranged on the upper surface of the rotating electric machine housing 60 and the first power conversion unit side connecting member 91 and the second power conversion unit side connecting member 92 arranged on the bottom of the power control unit housing 70, the three-phase connector terminal of the first rotating electric machine side connecting member 81 and the three-phase connector terminal of the first power conversion unit side connecting member 91 are electrically connected and the three-phase connector terminal of the second rotating electric machine side connecting member 82 and the three-phase connector terminal of the second power conversion unit side connecting member 92 are electrically connected.

In this way, the first rotating electric machine side connecting member 81 and the second rotating electric machine side connecting member 82 are electrically connected to the first power conversion unit side connecting member 91 and the second power conversion unit side connecting member 92. Thereby, the first rotating electric machines 12 and the second rotating electric machines 13 and the power conversion unit 20 are electrically connected. Thus, the first rotating electric machine 12 and the second rotating electric machine 13 can be controlled by the power control unit 200.

<Rotating Electric Machine Housing>

The rotating electric machine housing 60 has a rotating electric machine accommodation portion 61 which accommodates the first rotating electric machine 12 and the second rotating electric machine 13. The rotating electric machine accommodation portion 61 is formed by a space surrounded by an accommodation wall 62 of the rotating electric machine housing 60.

On the accommodation wall 62 on the upper surface of the rotating electric machine housing 60, a first fitting hole 631 into which the first rotating electric machine side connecting member 81 fits and a second fitting hole 632 into which the second rotating electric machine side connecting member 82 fits are provided. The first rotating electric machine side connecting member 81 is fitted to the first fitting hole 631 so as to protrude upward from the upper surface of the rotating electric machine housing 60 and is fixed to the rotating electric machine housing 60. The second rotating electric machine side connecting member 82 is fitted to the second fitting hole 632 so as to protrude upward from the upper surface of the rotating electric machine housing 60 and is fixed to the rotating electric machine housing 60.

The rotating electric machine accommodation portion 61 includes a bulging portion 64 which bulges upward between the first fitting hole 631 and the second fitting hole 632 of the rotating electric machine housing 60 when viewed from the rotation axis direction. That is, the bulging portion 64 bulges outward between the first connecting member 1b and the second connecting member 1c when viewed from the rotation axis direction. When viewed from the rotation axis direction, the bulging portion 64 is configured by an area surrounded by a convex wall portion 62a formed on the accommodation wall 62 between the first fitting hole 631 and the second fitting hole 632 of the rotating electric machine housing 60 and having a convex shape toward the outside of the rotating electric machine housing portion 61 and the imaginary line L2 connecting a pair of end portions 62.b of the convex wall portion 62a. The first rotating electric machine 12 is accommodated in the rotating electric machine housing 60 such that a part including the uppermost portion 12t is located at the bulging portion 64. That is, the first rotating electric machine 12 is accommodated in the rotating electric machine housing 60 such that the uppermost portion 12t is located outside the imaginary line L2 connecting the pair of end portions 62b of the convex wall portion 62a. Thereby, the vertical dimension of the rotating electric machine drive unit 10 can be reduced. In the embodiment, in the bulging portion 64 of the rotating electric machine accommodation portion 61, the distance between the first rotating electric machine 12 and the accommodation wall 62 of the rotating electric machine housing 60 is the shortest at the uppermost portion 12t.

<Electric Circuit Configuration of Rotating Electric Machine Drive Unit>

As illustrated in FIG. 10, a positive terminal PB and a negative terminal NB of the high-voltage battery BATh are connected to a DC connector 1a of the power conversion unit 20. The high-voltage battery BATh includes a battery case and a plurality of battery modules accommodated in the battery case. The battery module includes a plurality of battery cells connected in series. The positive terminal PB and the negative terminal NB are connected to positive and negative terminals of a plurality of battery modules connected in series in the battery case.

The first rotating electric machine 12 (MOT) generates a rotational driving force (power running operation) by electric power supplied from the high-voltage battery BATh. The second rotating electric machine 13 (GEN) generates electric power by the rotational driving force input to the rotation axis. Here, the second rotating electric machine 13 is configured to be able to transmit the rotational power of the internal combustion engine.

The power conversion unit 20 includes the power module 21, the reactor 22, the capacitor unit 23, the resistor 24, the first current sensor 25, the second current sensor 26, the third current sensor 27, the electronic control unit 28 (MOT GEN ECU), and the gate drive unit 29 (G/D VCU ECU).

The power module 21 includes a first power conversion circuit unit 31, a second power conversion circuit unit 32, and a third power conversion circuit unit 33. The first power conversion circuit unit 31 is connected to the first rotating electric machine 12 by a first connecting member 1b. The first power conversion circuit unit 31 converts DC power input from the high-voltage battery BATh via the third power conversion circuit unit 33 into three-phase AC power. The second power conversion circuit unit 32 is connected to the second rotating electric machine 13 by a second connecting member 1c. The second power conversion circuit unit 32 converts three-phase AC power input from the second rotating electric machine 13 into DC power. The DC power converted by the second power conversion circuit unit 32 can be supplied to at least one of the high-voltage battery BATh and the first power conversion circuit unit 31.

Each of the first power conversion circuit unit 31 and the second power conversion circuit unit 32 includes a bridge circuit formed by a plurality of switching elements connected in a bridge. For example, the switching element is a transistor such as an Insulated Gate Bipolar Transistor (IGBT) or a Metal Oxide Semi-conductor Field Effect Transistor (MOSFET). For example, in a bridge circuit, a pair of high-side arm and low-side arm U-phase transistors UH and UL, a pair of high-side arm and low-side arm V-phase transistors VH and VL, and a pair of high-side arm and low-side arm W-phase transistors WH and WL are respectively bridge-connected.

The collectors of the transistors UH, VL, and WL of the high-side arm are connected to the positive electrode terminal PI to form a high side arm. In each phase, each positive terminal PI of the high-side arm is connected to a positive electrode connection line 50p.

The emitters of the transistors UL, VL, and WL of the low-side arm are connected to a negative terminal NI to form a low-side arm. In each phase, each negative terminal NI of the low side arm is connected to a negative electrode connection line 50n.

In each phase, the emitters of the transistors UH, VH, and WH of the high-side arm are connected to the collectors of the transistors UL, VL, and WL, of the low-side arm at connection points TI.

In each phase of the first power conversion circuit unit 31, the connection point TI is connected to the first power conversion unit side terminal portion Q1 by a first connection line 51. The first power conversion unit side terminal portion Q1 is connected to the first connecting member 1b. The connection point TI of each phase of the first power conversion circuit unit 31 is connected to the first rotating electric machine 12 via the first connection line 51, the first power conversion unit side terminal portion Q1, the first connecting member 1b, and the first coil terminal Y1.

In each phase of the second power conversion circuit unit 32, the connection point TI is connected to the second power conversion unit side terminal portion Q2 by a second connection line 52. The second power conversion unit side terminal portion s connected to the second connecting member 1c. The connection point TI of each phase of the second power conversion circuit unit 32 is connected to the second rotating electric machine 13 via the second connection line 52, the second power conversion unit side terminal portion Q2, the second connecting member 1c, and the second coil terminal Y2.

The bridge circuit includes a diode which is connected between the collector and the emitter of each of the transistors UH, UL, VH, VL, WH, and WL in a forward direction from the emitter to the collector.

Based on a gate signal which is a switching command input from the gate drive unit 29 to the gate of each of the transistors UH, VH, WH, UL, VL, and WL, each of the first power conversion circuit unit 31 and the second power conversion circuit unit 32 switches on (conduction)/off (cut off) of the transistor pair of each phase. The first power conversion circuit unit 31 converts DC power input from the high-voltage battery BATh via the third power conversion circuit unit 33 into three-phase AC power and sequentially commutates the current to the three-phase stator windings of the first rotating electric machine 12, in such a manner that an AC U-phase current, V-phase current, and W-phase current are supplied to the three-phase stator windings. The second power conversion circuit unit 32 converts three-phase AC power output from the three-phase stator windings of the second rotating electric machine 13 into DC power by on (conduction)/off (cut oft) driving of the transistor pair of each phase synchronized with the rotation of the second rotating electric machine 13.

The third power conversion circuit unit 33 is a voltage control unit (VCU). The third power conversion circuit unit 33 includes a pair of high-side arm and low-side arm switching elements. For example, the third power conversion circuit unit 33 includes a high-side arm first transistor S1 and a low-side arm second transistor S2. The first transistor S1 has a collector connected to the positive terminal PV to form a high-side arm. The positive terminal PV of the high-side arm is connected to the positive electrode connection line 50p. The second transistor S2 has an emitter connected to the negative terminal NV to form a low-side arm. The negative terminal NV of the low-side arm is connected to the negative electrode connection line 50n. The emitter of the first transistor S1 of the high-side arm is connected to the collector of the second transistor S2 of the low-side arm. The third power conversion circuit unit 33 includes a diode which is connected between the collector and the emitter of each of the first transistor S1 and the second transistor S2 in the forward direction from the emitter to the collector.

The connection point between the first transistor S1 of the high-side arm and the second transistor S2 of the low-side arm is connected to the reactor 22 by a third connection line 53. Both ends of the reactor 22 are connected to a connection point of the first transistor S1 and the second transistor S2 and a positive terminal PB of the high-voltage battery BATh. The reactor 22 includes a coil and a temperature sensor which detects the temperature of the coil. The temperature sensor is connected to the electronic control unit 28 by a signal line.

The third power conversion circuit unit 33 switches on (conducting)/off (cut off) of the transistor pair based on a gate signal which is a switching command input from the gate drive unit 29 to each gate of the first transistor S1 and the second transistor S2.

When boosting, the third power conversion circuit unit 33 alternately switches between a first state in which the second transistor S2 is turned on (conducting) and the first transistor S1 is turned off (cut off) and a second state in which the second transistor S2 is turned off (cut off) and the first transistor S1 is turned on (conducting). In the first state, current flows sequentially to the positive terminal PB of the high-voltage battery BATh, the reactor 22, the second transistor S2, and the negative terminal NB of the high-voltage battery BATh. Therefore, the reactor 22 is DC-excited and magnetic energy is accumulated. In the second state, an electromotive voltage (induction voltage) is generated between both ends of the reactor 22 so as to prevent a change in magnetic flux caused by interruption of the current flowing through the reactor 22. The induced voltage due to the magnetic energy accumulated in the reactor 22 is superimposed on the battery voltage, and a boosted voltage higher than the voltage between the terminals of the high-voltage battery BATh is applied between the positive terminal PV and the negative terminal NV of the third power conversion circuit unit 33.

When regenerating, the third power conversion circuit unit 33 alternately switches between a second state and a first state. In the second state, current sequentially flows to the positive terminal PV of the third power conversion circuit unit 33, the first transistor S1, the reactor 22, and the positive terminal PB of the high-voltage battery BATh. Therefore, the reactor 22 is DC-excited and magnetic energy is accumulated. In the first state, an electromotive voltage (induction voltage) is generated between both ends of the reactor 22 so as to prevent a change in magnetic flux caused by interruption of the current flowing through the reactor 22. The induced voltage due to the magnetic energy accumulated in the reactor 22 is stepped down and a step-down voltage lower than the voltage between the positive terminal PV and the negative terminal NV of the third power conversion circuit unit 33 is applied between the positive terminal PB and the negative terminal NB of the high-voltage battery BATh.

The capacitor unit 23 includes a first smoothing capacitor 41, a second smoothing capacitor 42, and a noise filter 43.

The first smoothing capacitor 41 is connected between the positive terminal PB and the negative terminal NB of the high-voltage battery BATh. The first smoothing capacitor 41 smooths a voltage fluctuation generated due to the on/off switching operation of the first transistor S1 and the second transistor S2 during regeneration of the third power conversion circuit unit 33.

The second smoothing capacitor 42 is connected between the positive terminal PI and the negative terminal NI of each of the first power conversion circuit unit 31 and the second power conversion circuit unit 32 and between the positive terminal PV and the negative terminal NV of the third power conversion circuit unit 33. The second smoothing capacitor 42 is connected to a plurality of the positive terminals PI and the negative terminals NI, and the positive terminals PV and the negative terminals NV via the positive electrode connection line 50p and the negative electrode connection line 50n. The second smoothing capacitor 42 smooths the voltage fluctuation generated by the on/off switching operation of each of the transistors UH, UL, VH, VL, WH, and WL of each of the first power conversion circuit unit 31 and the second power conversion circuit unit 32. The second smoothing capacitor 42 smooths the voltage fluctuation generated due to the on/off switching operation of the first transistor S1 and the second transistor S2 when the third power conversion circuit unit 33 boosts the voltage.

The noise filter 43 is connected between the positive terminal PT and the negative terminal NI of each of the first power conversion circuit unit 31 and the second power conversion circuit unit 32 and between the positive terminal PV and the negative terminal NV of the third power conversion circuit unit 33. The noise filter 43 has two capacitors connected in series. The connection point of the two capacitors is connected to the body ground or the like of the rotating electric machine drive unit 10.

The resistor 24 is connected between the positive terminal PI and the negative terminal NI of each of the first power conversion circuit unit 31 and the second power conversion circuit unit 32 and between the positive terminal PV and the negative terminal NV of the third power conversion circuit unit 33.

The first current sensor 25 is arranged on the first connection line 51 which connects the connection point TI of each phase of the first power conversion circuit unit 31 and the first power conversion unit side terminal portion Q1 and detects each current of the U phase, the V phase, and the W phase. The second current sensor 26 is arranged on the second connection line 52 which connects the connection point TI of each phase of the second power conversion circuit unit 32 and the second power conversion unit side terminal portion Q2 and detects the current of each of the U phase, the V phase, and the W phase. The third current sensor 27 is disposed on the third connection line 53 which connects the connection point of the first transistor S1 and the second transistor S2 to the reactor 22 and detects a current flowing through the reactor 22. Each of the first current sensor 25, the second current sensor 26, and the third current sensor 27 is connected to the electronic control unit 28 by a signal line.

The electronic control unit 28 controls each operation of the first rotating electric machine 12 and the second rotating electric machine 13. For example, the electronic control unit 28 is a software function unit which functions when a predetermined program is executed by a processor such as a Central Processing Unit (CPU). The software function unit is an Electronic Control Unit (ECU) including an electronic circuit such as a processor such as a CPU, a Read Only Memory (ROM) for storing programs, a Random Access Memory (RAM) for temporarily storing data, and a timer. At least a part of the electronic control unit 28 may be an integrated circuit such as a Large Scale Integration (LSI). For example, the electronic control unit 28 performs current feedback control using a current detection value of the first current sensor 25 and a current target value corresponding to a torque command value for the first rotating electric machine 12 and generates a control signal input to the gate drive unit 29. For example, the electronic control unit 28 performs current feedback control using a current detection value of the second current sensor 26 and a current target value according to a regenerative command value for the second rotating electric machine 13 and generates a control signal input to the gate drive unit 29. The control signal is a signal indicating a timing for on (conduction)/off (cut off) driving the respective transistors UH, VH, WH, UL, VL, and WL of each of the first power conversion circuit unit 31 and the second power conversion circuit unit 32. For example, the control signal is a pulse width modulated signal or the like.

Based on the control signal received from electronic control unit 28, the gate drive unit 29 generates a gate signal for actually turning on (conducting)/off (cut off) the respective transistors UH, VH, WH, UL, VL, and WL of the first power conversion circuit unit 31 and second power conversion circuit unit 32. For example, the gate drive unit 29 generates a gate signal by performing amplification and level-shift of a control signal, and the like.

The gate drive unit 29 generates a gate signal for turning on (conducting)/off (cut off) each of the first transistor S1 and the second transistor S2 of the third power conversion circuit unit 33. For example, the gate drive unit 29 generates a gate signal having a duty ratio according to a boost voltage command at the time of boosting the third power conversion circuit unit 33 or a step-down voltage command at the time of regeneration of the third power conversion circuit unit 33. The duty ratio is a ratio of the first transistor S1 and the second transistor S2.

The invention is not limited to the embodiment described above and can be appropriately modified and improved.

For example, in this embodiment, the rotating electric machine drive unit 10 has two rotating electric machines, a first rotating electric machine 12 and a second rotating electric machine 13. However, the rotating electric machine drive unit 10 may have one rotating electric machine and be accommodated in the rotating electric machine housing 60. Also in this case, when viewed from the rotation axis direction, a part of the power control unit 200 is arranged so as to overlap the rotating electric machine housing 60 in the up-down direction.

Further, for example, in the embodiment, the power control unit 200 is mounted on the upper surface of the rotating electric machine housing 60. However, the power control unit 200 may be mounted at an arbitrary position on the outer peripheral surface of the rotating electric machine housing 60 when viewed from the rotation axis direction. For example, the power control unit 200 may be mounted on the front surface or the rear surface of the rotating electric machine housing 60.

In addition, at least the following matters are described in this specification. Although the corresponding components in the embodiment described above are shown in parentheses, the invention is not limited to this.

(1) A rotating electric machine drive unit (rotating electric machine drive unit 10) which includes a first rotating electric machine (first rotating electric machine 12), a second rotating electric machine (second rotating electric machine 13) having a rotation axis (rotation axis CL2) positioned parallel to a rotation axis (rotation axis CL1) of the first rotating electric machine and shifted in at least one of an up-down direction and a horizontal direction, a rotating electric machine housing (rotating electric machine housing 60) having a rotating electric machine accommodation portion (rotating electric machine accommodation portion 61) accommodating at least the first rotating electric machine, a power control unit (power control unit 200) having a power conversion unit (power conversion unit 20) which controls at least one of the first rotating electric machine and the second rotating electric machine, and a connecting member (first connecting member 1b) which electrically connects at least one of the first rotating electric machine and the second rotating electric machine to the power conversion unit of the power control unit, where when viewed from a rotation axis direction of the first rotating electric machine and the second rotating electric machine, a part of the power control unit is disposed so as to overlap with at least one of the rotating electric machine housing and the first rotating electric machine in a radial direction of the first rotating electric machine.

According to (1), since a part of the power control unit is disposed so as to overlap with the rotating electric machine housing in the radial direction of the first rotating electric machine when viewed from the rotation axis direction, the size of the rotating electric machine drive unit can be reduced.

(2) In the rotating electric machine drive unit according to (1), at least a part of the connecting member is disposed at a position overlapping with the first rotating electric machine in the rotation axis direction when viewed from the radial direction.

According to (2), at least a part of the connecting member is disposed at a position overlapping the first rotating electric machine in the rotation axis direction when viewed from the radial direction. Therefore, the size of the rotating electric machine drive unit in the rotation axis direction can be suppressed from increasing.

(3) The rotating electric machine drive unit according to (1) or (2), where the first rotating electric machine includes, a first rotor (first rotor 121), and a first stator (first stator 122) including a first stator core (first stator core 123) surrounding an outer periphery of the first rotor and a first coil (first coil 124) mounted on the first stator core, and circuit components (power module 21, reactor 22, capacitor unit 23) constituting the power conversion unit are arranged so as not to overlap with the first stator core in the rotation axis direction when viewed from the radial direction.

According to (3), the circuit components configuring the power conversion unit are arranged so as not to overlap with the first stator core in the rotation axis direction when viewed from the radial direction. Therefore, the power conversion unit can be arranged regardless of the position and the size of the diameter of the first stator core, and thus the size of the rotating electric machine drive unit can be reduced.

(4) In the rotating electric machine drive unit according to (3), the second rotating electric machine includes, a second rotor (second rotor 131), and a second stator (second stator 132) including a second stator core (second stator core 133) surrounding an outer periphery of the second rotor and a second coil (second coil 134) mounted on the second stator core, and at least a part of the circuit components of the power conversion unit is disposed so as to overlap with the second stator core in the rotation axis direction when viewed from the radial direction.

According to (4), at least a part of the circuit components of the power conversion unit is arranged so as to overlap the second stator core in the rotation axis direction when viewed from the radial direction. Therefore, the radial dimension of the rotating electric machine drive unit can be reduced while suppressing the dimension of the rotating electric machine drive unit in the rotation axis direction from becoming long.

(5) In the rotating electric machine drive unit according to any one of (1) to (4), the connecting member includes, a first connecting member (first connecting member 1b) which electrically connects the first rotating electric machine and the power conversion unit of the power control unit, and a second connecting member (second connecting member 1c) which electrically connects the second rotating electric machine and the power conversion unit of the power control unit, the first connecting member includes a first rotating electric machine side connecting member (first rotating electric machine side connecting member 81), a first rotating electric machine side connecting portion (first rotating electric machine side connecting portion 810) that electrically connects the first rotating electric machine side connecting member and the first rotating electric machine, a first power conversion unit side connecting member (first power conversion unit side connecting member 91) connected to and electrically connected to the first rotating electric machine side connecting member, and a first power conversion unit side connecting portion (first power conversion unit side connecting portion 910) that electrically connects the first power conversion unit side connecting member and the power conversion unit, the second connecting member includes a second rotating electric machine side connecting member (second rotating electric machine side connecting member 82), a second rotating electric machine side connecting portion (second rotating electric machine side connecting portion 820) that electrically connects the second rotating electric machine side connecting member and the second rotating electric machine, a second power conversion unit side connecting member (second power conversion unit side connecting member 92) connected to and electrically connected to the second rotating electric machine side connecting member, and a second power conversion unit side connecting portion (second power conversion unit side connecting portion 920) that electrically connects the second power conversion unit side connecting member and the power conversion unit, when viewed from the rotation axis direction, the first rotating electric machine side connecting member and the second rotating electric machine side connecting member are arranged at different positions in a tangential direction (front-rear direction) of the first rotating electric machine, and the rotation axis of the first rotating electric machine is located between the first rotating electric machine side connecting member and the second rotating electric machine side connecting member in the tangential direction, and in the first rotating electric machine, in a direction orthogonal to an imaginary line (imaginary line L1) which connects a bottom portion of the first rotating electric machine side connecting member located inside the rotating electric machine accommodation portion and a bottom portion of the second rotating electric machine side connecting member located inside the rotating electric machine accommodation portion, an outermost diameter portion (uppermost portion 12t) is arranged in the rotating electric machine accommodation portion so as to be located outside the imaginary line.

According to (5), in the first rotating electric machine, in the direction orthogonal to the imaginary line connecting the bottom portion of the first rotating electric machine side connecting member and the bottom portion of the second rotating electric machine side connecting member, the outermost diameter portion is arranged in the rotating electric machine accommodation portion so as to be located outside the imaginary line. As a result, the size of the rotating electric machine drive unit can be reduced.

(6) A rotating electric machine drive unit (rotating electric machine drive unit 10) which includes a rotating electric machine (first rotating electric machine 12), a rotating electric machine housing (rotating electric machine housing 60) accommodating the rotating electric machine, a power control unit (power control unit 200) having a power conversion unit (power conversion unit 20) that controls the rotating electric machine, and a connecting member (first connecting member 1b) which electrically connects the rotating electric machine and the power conversion unit of the power control unit, where a part of the power control unit is disposed so as to overlap with at least one of the rotating electric machine housing and the rotating electric machine in a radial direction of the rotating electric machine when viewed from a rotation axis direction of the rotating electric machine.

According to (6), a part of the power control unit is disposed so as to overlap with at least one of the rotating electric machine housing and the rotating electric machine in the radial direction of the rotating electric machine when viewed from the rotation axis direction of the rotating electric machine. Therefore, the size of the rotating electric machine drive unit can be reduced.

The invention claimed is:

1. A rotating electric machine drive unit comprising:

a first rotating electric machine;

a second rotating electric machine having a rotation axis positioned parallel to a rotation axis of the first rotating electric machine and shifted in at least one of an up-down direction and a horizontal direction;
a rotating electric machine housing having a rotating electric machine accommodation portion accommodating at least the first rotating electric machine;
a power control unit having a power conversion unit which controls at least one of the first rotating electric machine and the second rotating electric machine; and
a connecting member which electrically connects at least one of the first rotating electric machine and the second rotating electric machine to the power conversion unit of the power control unit, wherein
when viewed from a rotation axis direction of the first rotating electric machine and the second rotating electric machine, the power control unit is disposed on the outer peripheral surface of the rotating electric machine housing, and wherein
when viewed from the rotation axis direction of the first rotating electric machine and the second rotating electric machine, a part of the power control unit is disposed so as to overlap with at least one of the rotating electric machine housing and the first rotating electric machine in a radial direction of the first rotating electric machine.

2. The rotating electric machine drive unit according to claim 1, wherein
at least a part of the connecting member is disposed at a position overlapping with the first rotating electric machine in the rotation axis direction when viewed from the radial direction.

3. The rotating electric machine drive unit according to claim 1, wherein
the first rotating electric machine includes,
a first rotor, and
a first stator including a first stator core surrounding an outer periphery of the first rotor and a first coil mounted on the first stator core, and
circuit components constituting the power conversion unit are arranged so as not to overlap with the first stator core in the rotation axis direction when viewed from the radial direction.

4. The rotating electric machine drive unit according to claim 3, wherein
the second rotating electric machine includes,
a second rotor, and
a second stator including a second stator core surrounding an outer periphery of the second rotor and a second coil mounted on the second stator core, and
at least a part of the circuit components of the power conversion unit is disposed so as to overlap with the second stator core in the rotation axis direction when viewed from the radial direction.

5. The rotating electric machine drive unit according to claim 1, wherein
the connecting member includes,
a first connecting member which electrically connects the first rotating electric machine and the power conversion unit of the power control unit, and
a second connecting member which electrically connects the second rotating electric machine and the power conversion unit of the power control unit,
the first connecting member includes a first rotating electric machine side connecting member, a first rotating electric machine side connecting portion for electrically connecting the first rotating electric machine side connecting member and the first rotating electric machine, a first power conversion unit side connecting member connected to and electrically connected to the first rotating electric machine side connecting member, and a first power conversion unit side connecting portion that electrically connects the first power conversion unit side connecting member and the power conversion unit,
the second connecting member includes a second rotating electric machine side connecting member, a second rotating electric machine side connecting portion for electrically connecting the second rotating electric machine side connecting member and the second rotating electric machine, a second power conversion unit side connecting member connected to and electrically connected to the second rotating electric machine side connecting member, and a second power conversion unit side connecting portion that electrically connects the second power conversion unit side connecting member and the power conversion unit,
when viewed from the rotation axis direction,
the first rotating electric machine side connecting member and the second rotating electric machine side connecting member are arranged at different positions in a tangential direction of the first rotating electric machine, and
the rotation axis of the first rotating electric machine is located between the first rotating electric machine side connecting member and the second rotating electric machine side connecting member in the tangential direction, and
in the first rotating electric machine, in a direction orthogonal to an imaginary line which connects a bottom portion of the first rotating electric machine side connecting member located inside the rotating electric machine accommodation portion and a bottom portion of the second rotating electric machine side connecting member located inside the rotating electric machine accommodation portion, an outermost diameter portion is arranged in the rotating electric machine accommodation portion so as to be located outside the imaginary line.

6. A rotating electric machine drive unit comprising:
a rotating electric machine;
a rotating electric machine housing accommodating the rotating electric machine;
a power control unit having a power conversion unit that controls the rotating electric machine; and
a connecting member which electrically connects the rotating electric machine and the power conversion unit of the power control unit, wherein
when viewed from a rotation axis direction of the rotating electric machine, the power control unit is disposed on the outer peripheral surface of the rotating electric machine housing, and wherein
a part of the power control unit is disposed so as to overlap with at least one of the rotating electric machine housing and the rotating electric machine in a radial direction of the rotating electric machine when viewed from the rotation axis direction of the rotating electric machine.

* * * * *